(12) United States Patent
Hickman

(10) Patent No.: US 6,402,503 B1
(45) Date of Patent: Jun. 11, 2002

(54) PLASTIC INJECTION MOLDING APPARATUS

(75) Inventor: Randall A. Hickman, Graytown, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 0 days.

(21) Appl. No.: 09/468,388

(22) Filed: Dec. 20, 1999

(51) Int. Cl.[7] .......................... B29C 45/20; B29C 45/26
(52) U.S. Cl. ..................... 425/568; 425/567; 425/577
(58) Field of Search ................. 425/568, 571, 425/567, 577

(56) References Cited

U.S. PATENT DOCUMENTS

| | | | | |
|---|---|---|---|---|
| 3,915,610 A | * | 10/1975 | Kohler | ............... 425/568 |
| 4,434,053 A | * | 2/1984 | Osuna-Diaz | ............ 425/568 |
| 4,591,475 A | * | 5/1986 | Tomka et al. | ............ 425/568 |
| 5,044,927 A | * | 9/1991 | Di Simone et al. | ...... 264/328.8 |
| 5,340,304 A | | 8/1994 | Nakamura | |

FOREIGN PATENT DOCUMENTS

| | | | | |
|---|---|---|---|---|
| JP | 4-16321 | * | 1/1992 | ............... 425/577 |

* cited by examiner

*Primary Examiner*—Allan R. Kuhns

(57) ABSTRACT

Injection molding apparatus (10) for molding a thermoplastic article (A) from a moldable thermoplastic material. The molding apparatus includes a core pin (12) around which the article is formed in a cavity that is defined by separable mold halves (14, 16). Moldable thermoplastic material is introduced into the mold cavity, coaxially of the core pin, from an injection nozzle (18) through a restricted passage or gate (20). The nozzle seats solely in a radial extension (16a) of one of the mold halves, which is received in a recess (14a) of the other mold half when the mold halves are closed with respect to one another, and the gate extends solely through the extension (16a) of the mold half (16).

1 Claim, 2 Drawing Sheets

PLASTIC INJECTION MOLDING APPARATUS

BACKGROUND OF THE INVENTION

1. Field of the Invention

This invention relates to an injection molding apparatus and method for molding articles from a thermoplastic material. More particularly, this invention relates to an injection molding apparatus and method by which articles are sequentially formed in a mold assembly that is made up of separable mold halves, which repeatedly close and open relative to one another during each molding cycle.

2. Description of the Prior Art

Many types of useful articles, for example, preforms or parisons of hollow containers, are produced by injection molding from a suitable thermoplastic material, such as high density polyethylene, polypropylene or polyethylene terephthalalate. Injection molding apparatus for molding such articles includes a plurality of mold assemblies, each mold assembly containing a core pin, around which the article is molded, and a separable pair of mold halves that open and close with respect to one another around the core pin to define, when closed, a mold cavity that corresponds in size and shape to the desired outline of the article being molded. A suitable thermoplastic resin at an elevated temperature suitable for molding is introduced into the mold assembly through a gate at an end thereof, from an injection nozzle and co-axially of the mold assembly, to fill the portion of the mold cavity that surrounds the exterior of the core pin, to thereby form the article being molded. U.S. Pat. No. 5,340,304 (Nakamura) discloses injection molding apparatus that generally corresponds to the foregoing description of known, plastic article injection molding devices.

In known plastic article injection molding devices, the mold halves that define the mold cavity are usually symmetrical, (at least when the article being molded is substantially symmetrical) and a nozzle is provided to introduce the moldable plastic resin into the mold cavity through a gate therein. The resin must be introduced substantially along the parallel axes of the mold cavity and the core pin for proper circumferential distribution of the resin within the mold cavity. When the mold halves are symmetrical as taught by the prior art, the nozzle will make contact with both mold halves, and opening and closing of the mold assembly while the nozzle is in contact therewith can lead to impact damage to the nozzle, often requiring replacement of the nozzle after limited use thereof.

SUMMARY OF THE INVENTION

Injection molding apparatus according to the present invention includes partable mold halves surrounding a core pin to define a mold cavity for molding a hollow article from a thermoplastic material. However, the mold halves are non-symmetrical with respect to one another, and a first one of the mold halves has an extension at its thermoplastic material receiving end to permit a nozzle for introducing thermoplastic material into the mold cavity to seat solely and entirely in the first mold half. Thus, the mold halves can be separated from one another solely by moving the second mold half away from the first mold half, and no nozzle contact need occur between the nozzle and either of the mold halves during the opening and closing of the mold halves, which helps to prevent impact damage to the nozzle as a result of the opening and closing of the mold assembly.

Accordingly, it is an object of the present invention to provide an improved injection molding apparatus and method for molding articles from a moldable thermoplastic material. More particularly, it is an object of the present invention to provide an injection molding apparatus and method of the foregoing character that avoids the possibility of contact damage of the thermoplastic material injection nozzle as the separable mold halves open and close with respect to one another.

For a further understanding of the present invention and the objects thereof, attention is directed to the drawing and to the following brief description thereof, to the detailed description of the preferred embodiment and to the appended claims.

DETAILED DESCRIPTION OF THE PREFERRED EMBODIMENT

Figure 1:
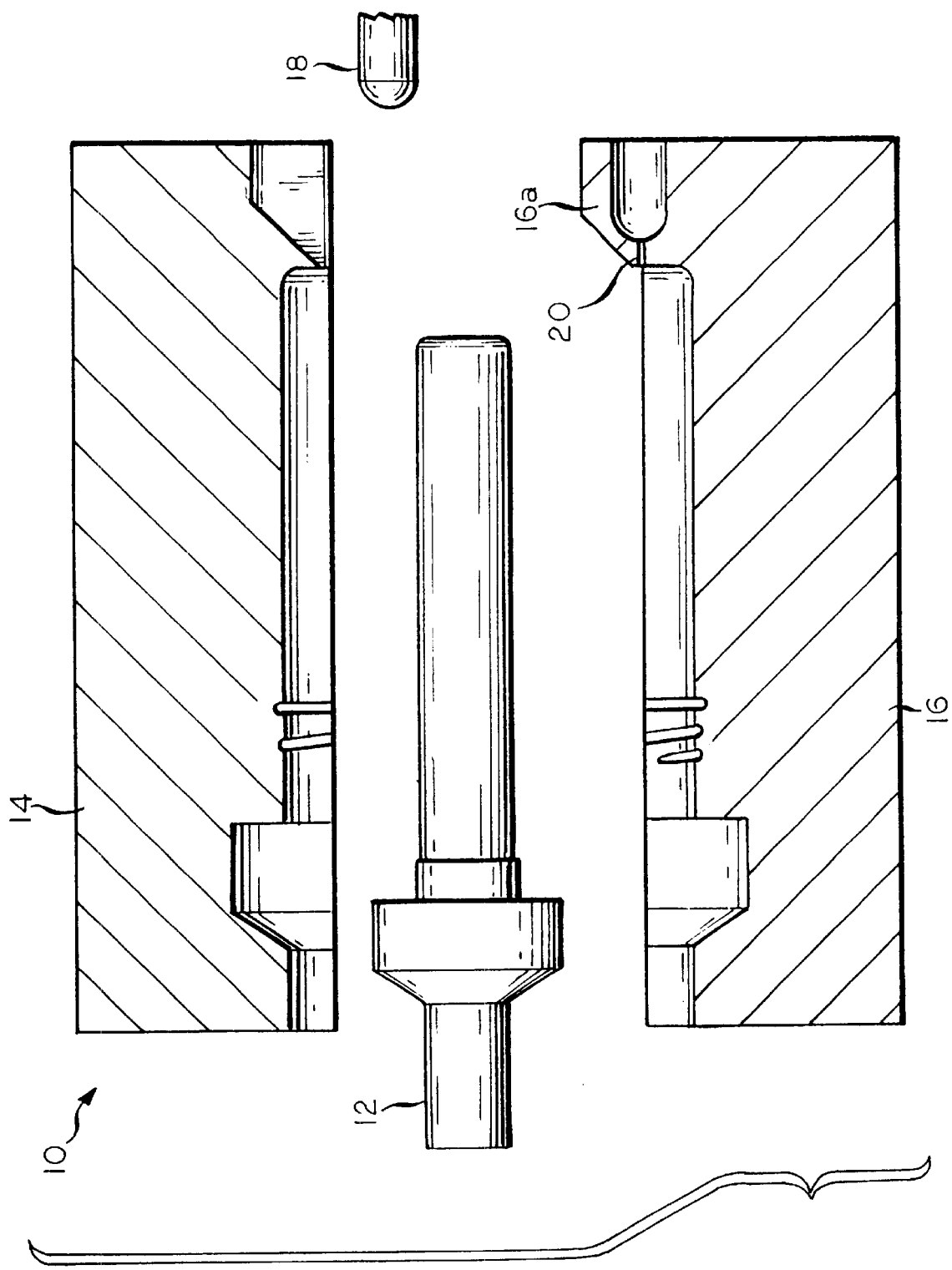
FIG. 1 is an exploded view, partly in cross-section, of a mold assembly of an injection molding apparatus according to the preferred embodiment of the present invention.

A mold assembly of an injection molding apparatus according to the preferred embodiment of the present invention is identified generally by reference numeral 10 in the drawings. The mold assembly 10, which is suitable for use in an injection blow molding process, includes a core pin 12 around which an article A, illustratively, a parison or preform of a blown plastic container, is formed. The article A is formed within a cavity defined by interior surfaces of separable mold halves 14, 16 of the mold assembly 10 when the mold halves are joined in their FIG. 2 closed condition of the molding assembly 10.

A suitable moldable thermoplastic material at an elevated temperature is introduced into the mold assembly 10, when closed, from an injection nozzle 18 through a restricted passage 20 in the mold assembly 10, the restricted passage 20 often being referred to as a gate. For proper circumferential orientation of the thermoplastic material within the mold assembly 10, it is important that the flow axes of the flow nozzle 18 and the gate 20 be substantially coaxial with one another and with the longitudinal central axis of the core pin 12. Apparatus as thus far described is suitable for the injection molding of articles from a variety of thermoplastic materials, including high density polyethylene, polypropylene or polyethylene terephthalalate.

Figure 2:
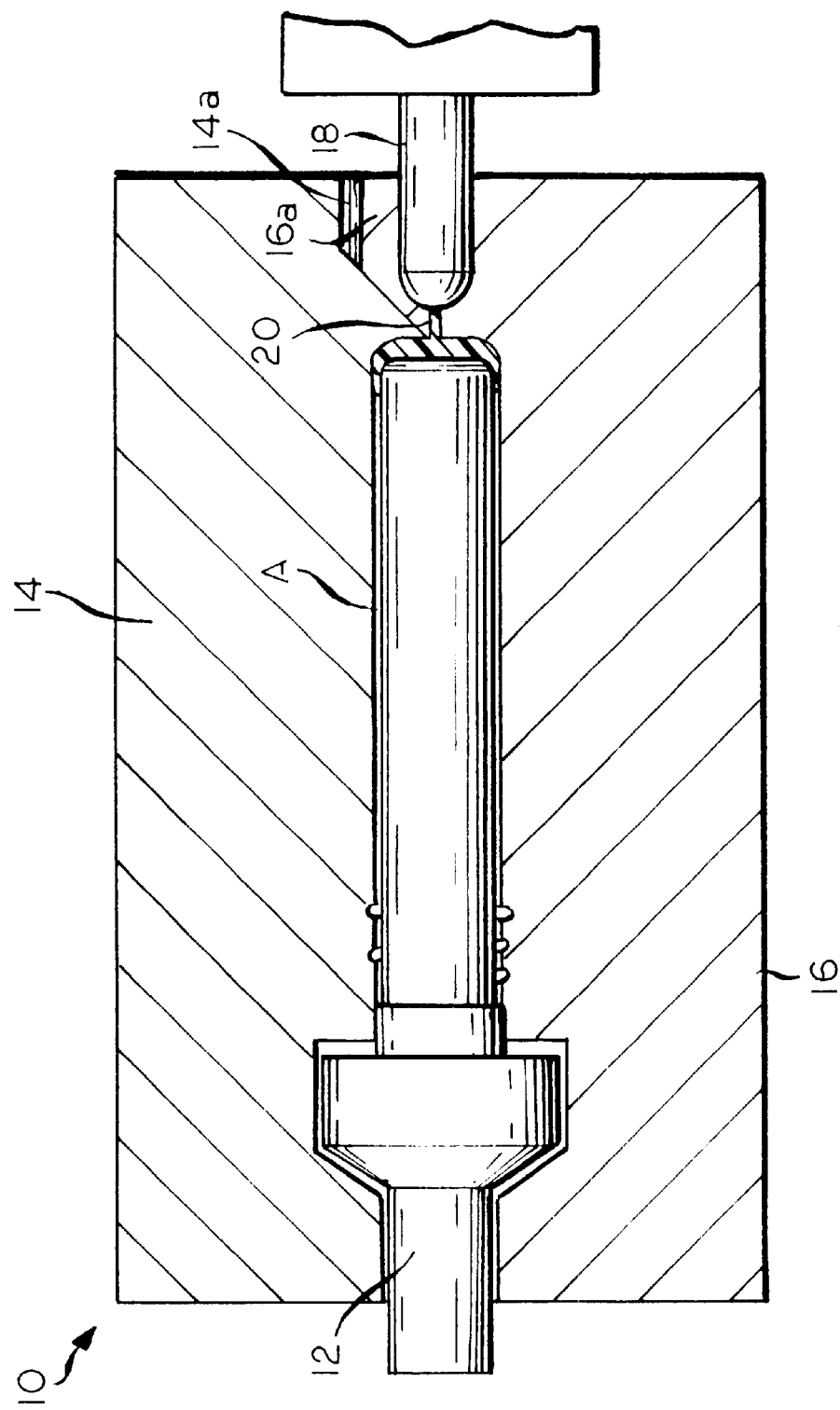
FIG. 2 is a view like FIG. 1 of the elements of FIG. 1 in their closed, molding positions relative to one another during the molding of an article therein.

To avoid repeated contacting of the injection nozzle 18 by the mold halves 14, 16, or either of them, the mold halves 14, 16 are constructed in non-symmetrical configuration in the region of the injection nozzle 18 and the gate 20. Thus, one of mold halves 14, 16, shown as the mold half 16, is provided with a radially extending extension 16a at its resin introduction end, and the other of mold halves, 14, 16, shown as the mold half 14, is provided with a complemental recess 14a at its resin introduction end, the recess 14a receiving the extension 16a in the closed condition of the mold assembly 10, as shown in FIG. 2. The injection nozzle 18, thus, seats entirely within the extension 16a of the mold half 16, and, similarly, the gate 20 is entirely positioned within the mold half 16a. Consequently, the mold halves 14, 16 may be parted at the conclusion of a molding cycle to remove an article A at the completion of its molding solely by moving the mold half 14. away from the mold half 16, and the injection nozzle 18 will then not be impacted by either the mold half 14 or the mold half 16 when the mold half 14 and the mold half 16 are closed to begin a repeat of the molding cycle.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. Apparatus for producing thermoplastic articles from a supply of a moldable thermoplastic material, said apparatus comprising:

a mold assembly defining a mold cavity, said mold assembly comprising first and second separable mold halves each of which defines a part of a mold cavity, said first and second mold halves being joined to define the mold cavity during the molding of an article in the mold cavity;

a nozzle for introducing molten thermoplastic material into the mold assembly, said nozzle being in engagement with only one of said first and second mold halves during introduction of moldable thermoplastic material into said mold assembly;

wherein one of said first and second mold halves has a circumferential extent, at a nozzle engaging end thereof, of greater than 180°, and wherein said nozzle is aligned with a longitudinal central axis of said mold cavity during introduction of moldable thermoplastic material into the mold assembly; and a core pin positioned within said mold assembly during the molding of a thermoplastic article in the mold assembly, said nozzle being coaxially positioned with respect to said core pin during introduction of moldable thermoplastic material into said mold assembly.

\* \* \* \* \*